(12) United States Patent
Taylor

(10) Patent No.: US 8,990,127 B2
(45) Date of Patent: Mar. 24, 2015

(54) METHOD AND SYSTEM FOR ONTOLOGY-DRIVEN QUERYING AND PROGRAMMING OF SENSORS

(75) Inventor: Kerry Lea Taylor, Australian Capital Territory (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 298 days.

(21) Appl. No.: 13/380,469

(22) PCT Filed: Jun. 22, 2009

(86) PCT No.: PCT/AU2009/000799
§ 371 (c)(1),
(2), (4) Date: Mar. 19, 2012

(87) PCT Pub. No.: WO2010/148419
PCT Pub. Date: Dec. 29, 2010

(65) Prior Publication Data
US 2012/0161940 A1    Jun. 28, 2012

(51) Int. Cl.
*G06F 15/18* (2006.01)
*G06F 17/30* (2006.01)
*G01D 21/00* (2006.01)

(52) U.S. Cl.
CPC .......... *G06F 17/30734* (2013.01); *G01D 21/00* (2013.01); *G06F 17/30967* (2013.01); *G06F 17/30979* (2013.01)
USPC ......................................................... 706/12

(58) Field of Classification Search
CPC ................................ G06F 9/4443; G06N 5/02

USPC ...................................................... 706/12, 45
See application file for complete search history.

(56) References Cited

U.S. PATENT DOCUMENTS

2008/0250316 A1    10/2008 Zhang et al.

OTHER PUBLICATIONS

Lee, M. C., Tsai, K. H., & Wang, T. I. (2008). A practical ontology query expansion algorithm for semantic-aware learning objects retrieval. Computers & Education, 50(4), 1240-1257.*
Li, Lily, and Kerry Taylor. "A framework for semantic sensor network services." Service-Oriented Computing—ICSOC 2008. Springer Berlin Heidelberg, 2008. 347-361.*

(Continued)

*Primary Examiner* — David Vincent
(74) *Attorney, Agent, or Firm* — Brinks Gilson & Lione

(57) ABSTRACT

Described embodiments relate to a method of ontology-driven querying or programming of at least one sensor. The method comprises generating at a query origin a query or command for execution in relation to the at least one sensor, transmitting the query or command to an ontology transformer over a first network, classifying the query or command according to a domain ontology and one or more predetermined capabilities of the at least one sensor, generating a transformed query or program based on the classified query or command using one or more code fragments stored in a memory accessible to the ontology transformer, transmitting the transformed query or program to at least one sensor node in communication with the at least one sensor for execution of the transformed query or program by the at least one sensor node in relation to the at least one sensor, receiving at the ontology transformer from the at least one sensor node at least one result of the query or program, and returning the at least one result.

27 Claims, 9 Drawing Sheets

(56) References Cited

OTHER PUBLICATIONS

Ding, Li, et al. "Using ontologies in the semantic web: A survey." Ontologies. Springer US, 2007. 79-113.*

Na, A. et al., *Sensor Observation Service*, Open Geospatial Consortium Inc., Jan. 18, 2006, Doc. Reference OGC 05-088rl.

Gomez M. et al., *An Ontology-Centric Approach to Sensor-Mission Assignment*, Proceedings of the 16th International Conference on Knowledge Engineering: Practice and Patterns, Sep. 29-Oct. 2, 2008, Lecture Notes in Artificial Intelligence; vol. 5268.

Russomanno D. J. et al.: "Building a Sensor Ontology: A Practical Approach Leveraging ISO and OGC Models", Jun. 27-30, 2005, The 2005 International Conference on Artificial Intelligence.

Russomanno D. J. et al.: "Sensor Ontologies: From Shallow to Deep Models" Mar. 20-22, 2005, ISBN: 0-7803-8808-9.

Henson C. A. et al. "An Ontological Representation of Time Series Observations on the Semantic Sensor Web", Jun. 1, 2009, 1st International Workshop on the Semantic Sensor Web (SemSensWeb 2009).

Preece A. et al. "An Ontology-Based Approach to Sensor-Mission Assignment", Sep. 25-27, 2007, Annual Conference of ITA 2007.

Barnaghi P. M. et al. "Sense and Sens'abilty: Semantic Data Modelling for Sensor Networks", Jun. 10-12, 2009, ICT Mobile Summit 2009 Conference Proceedings.

* cited by examiner

| Temperature sensor | Relative Humidity sensor |
|---|---|
| ⬢ material_thing:Sensor<br>⊙ measures only property:Temperature<br>⊞ measures some property:Temperature | ⬢ material_thing:Sensor<br>⊙ measures only property:RelativeHumidity<br>⊞ measures some property:RelativeHumidity |
| Wind speed sensor | Wind direction sensor |
| ⬢ material_thing:Sensor<br>⊙ measures only (phenomena:Wind and property:Speed)<br>⊞ measures some (phenomena:Wind and property:Speed) | ⬢ material_thing:Sensor<br>⊙ measures only (phenomena:Wind and space:Direction)<br>⊞ measures some (phenomena:Wind and space:Direction) |

Fig. 4

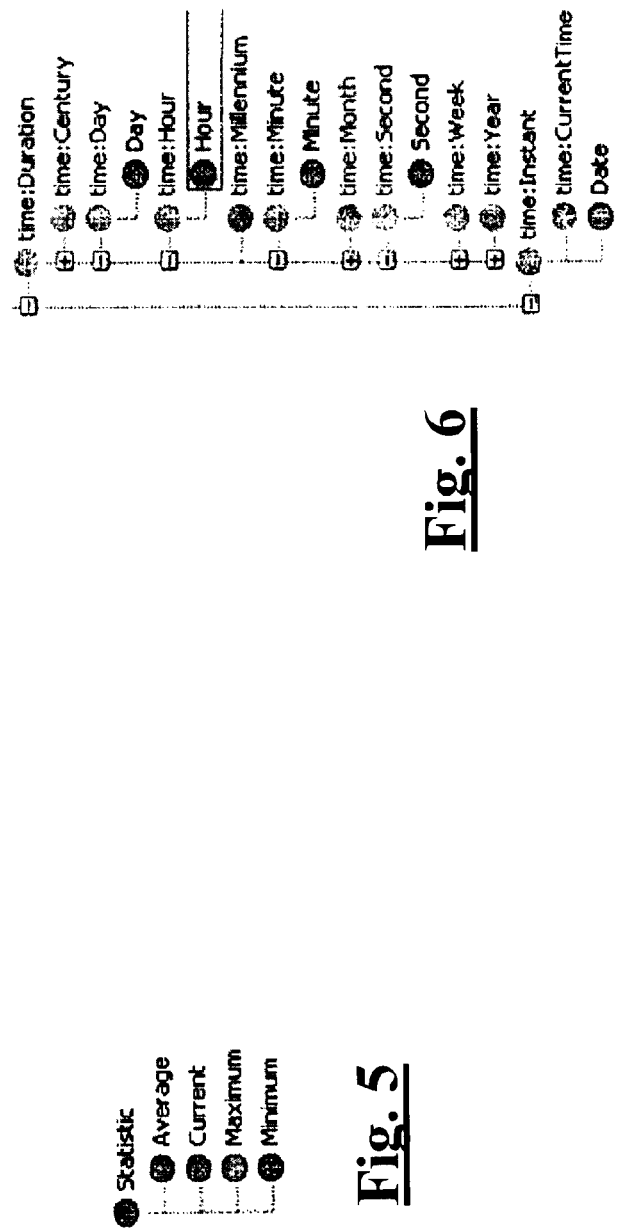

Fig. 6

● Statistic
  ● Average
  ● Current
  ● Maximum
  ● Minimum

Fig. 5

| Hour restrictions | Second restrictions |
|---|---|
| ● time:Hour<br>● hasSubPeriod only (Minute or Second)<br>● hasSubPeriod some Minute<br>● hasSubPeriod some Second<br>------<br>● numerics:Vector or numerics:Scalar or numerics:Tensor<br>● numerics:hasDefaultUnit has units:second | ● time:Second<br>● not (hasSubPeriod some time:Duration)<br>------<br>● numerics:Vector or numerics:Scalar or numerics:Tensor<br>● numerics:hasDefaultUnit has units:second |

Fig. 7

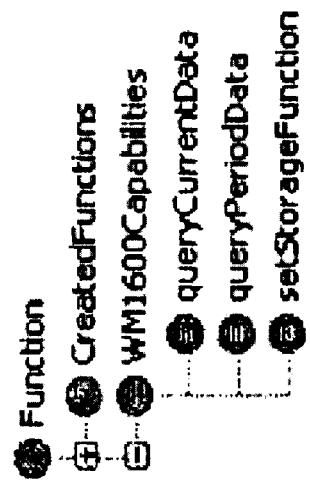

Fig. 8

*queryCurrentData*
- not (usesPeriod some (time:Duration or time:Instant))
- not (usesStatistic some Statistic)
- usesSensor some (TemperatureSensor or HumiditySensor or WindSpeedSensor or WindDirectionSensor)

*queryPeriodData*
- ((usesPeriod some (time:Duration or time:Instant)) and not (usesStatistic some Statistic))
  or
  ((usesStatistic some Statistic) and not (usesPeriod some (time:Duration or time:Instant)))
- usesSensor some (TemperatureSensor or HumiditySensor or WindSpeedSensor or WindDirectionSensor)

*setStorageFunction*
- usesPeriod some (Day or Hour or Minute or Second)
- usesSensor some (TemperatureSensor or HumiditySensor or WindSpeedSensor or WindDirectionSensor)
- usesStatistic some Statistic

Fig. 9

Reprogramming query
- CreatedFunctions
- usesPeriod some (time:Duration and (hasSubPeriod some Day))
- usesSensor exactly 1 HumiditySensor
- usesStatistic some Average

- usesPeriod some Day

Request current humidity query
- CreatedFunctions
- not (usesPeriod some (time:Duration or time:Instant))
- not (usesStatistic some Statistic)
- usesSensor exactly 1 HumiditySensor

Fig. 10 periodQuery1

- CreatedFunctions
- not (usesPeriod some (time:Duration or time:Instant))
- usesSensor exactly 1 TemperatureSensor
- usesStatistic some Average
- usesStatistic some Current
- usesStatistic some Maximum
- usesStatistic some Minimum periodQuery2

- CreatedFunctions
- not (usesStatistic some Statistic)
- usesPeriod some Day
- usesPeriod some Hour
- usesPeriod some Minute
- usesPeriod some Second
- usesSensor exactly 1 TemperatureSensor

Fig. 11

**The *WM1600* Class**

- hasFunction only (queryPeriodData or queryCurrentData or setStorageFunction)
- hasFunction some (queryPeriodData or queryCurrentData or setStorageFunction)

- Device

Fig. 12

US 8,990,127 B2

METHOD AND SYSTEM FOR ONTOLOGY-DRIVEN QUERYING AND PROGRAMMING OF SENSORS

This application is a National Stage of International Application No. PCT/AU2009/000799 filed on Jun. 22, 2009, the entirety of which is hereby incorporated by reference.

TECHNICAL FIELD

The described embodiments relate to methods and system for ontology-driven querying and programming of sensors. In particular, the sensors may be part of a remote sensor network in communication with a node that is accessible using a public network.

BACKGROUND

Programming sensor nodes for data collection in sensor networks is notoriously difficult. A programmer has to think not only in terms of the network-wide result to be achieved, but also how to deal with message routing, data loss, energy conservation, radio behaviour, radio management and local event interactions, as well as heterogeneity in the underlying sensor architectures, sensor capabilities and programming languages supported by such sensors.

It is desired to address or ameliorate one or more shortcomings or disadvantages associated with existing techniques for data collection and/or programming of sensors, or to at least provide useful alternatives thereto.

SUMMARY

Certain embodiments relate to a method of ontology-driven querying or programming of at least one sensor, the method comprising:
generating at a query origin a query or command for execution in relation to the at least one sensor;
transmitting the query or command to an ontology transformer over a first network;
classifying the query or command according to an ontology and one or more predetermined capabilities of the at least one sensor;
generating a transformed query or program based on the classified query or command using one or more code fragments stored in a memory accessible to the ontology transformer;
transmitting the transformed query or program to at least one sensor node in communication with the at least one sensor for execution of the transformed query or program by the at least one sensor node in relation to the at least one sensor;
receiving from the at least one sensor node at least one result of the query or program; and
returning the at least one result.

Other embodiments relate to a system for ontology-driven querying or programming of at least one sensor, the system comprising:
means for generating at a query origin a query or command for execution in relation to the at least one sensor and for transmitting the query or command to an ontology transformer over a first network;
means for classifying the query or command according to an ontology and one or more predetermined capabilities of the at least one sensor;
means for generating a transformed query or program based on the classified query or command using one or more code fragments stored in a memory accessible to the ontology transformer, wherein the means for generating a transformed query or program comprises means for transmitting the transformed query or program to at least one sensor node in communication with the at least one sensor for execution of the transformed query or program by the at least one sensor node in relation to the at least one sensor and comprises means for receiving from the at least one sensor node at least one result of the query or program and returning the at least one result.

Other embodiments relate to a system for ontology-driven querying or programming of at least one sensor, the system comprising:
a query origin configured to generate a query or command for execution in relation to the at least one sensor;
an ontology reasoner configured to classify the query or command according to an ontology and one or more predetermined capabilities of the at least one sensor;
at least one sensor node in communication with the at least one sensor; and
an ontology transformer in communication with the query origin, the ontology reasoner and the at least one sensor, wherein the ontology transformer is configured: to receive the query or command and pass the query or command to the ontology reasoner for classification, to generate a transformed query or program based on the classified query or command using one or more code fragments stored in a memory accessible to the ontology transformer, to transmit the transformed query or program to the at least one sensor node for execution of the transformed query or program by the at least one sensor node in relation to the at least one sensor, to receive from the at least one sensor node at least one result of the query or program and to return the at least one result.

BRIEF DESCRIPTION OF THE DRAWINGS

Embodiments are described in further detail below, by way of example, with reference to the accompanying drawings in which:

FIG. 4 is an illustration depicting a table of definition of sensors.

FIG. 5 is an illustration depicting a statistic class for weather station capability.

FIG. 6 is an illustration depicting units of time for the weather station.

FIG. 7 is an illustration depicting a table of a definition of hour and second.

FIG. 8 is an illustration depicting weather station capability concepts.

FIG. 9 is an illustration depicting a complete definition of capability classes.

FIG. 10 is an illustration depicting example queries.

FIG. 11 is an illustration depicting examples of queryPeriodData queries.

FIG. 12 is an illustration depicting a weather station device description.

DETAILED DESCRIPTION

The described embodiments relate generally to methods and systems for ontology-driven querying and programming of sensors. Such sensors may include, for example, single or plural sensors, possibly operating in isolation or as a part of a sensor network, in communication with a sensor node. The sensor node is responsible for direct querying or control of each of the sensors associated with that node. The embodiments described herein facilitate ontology-driven querying or control of the sensors via the relevant node in a manner that is independent of any technical requirements of the interface of each sensor, thereby tolerating the heterogeneity that is common among different sensors across various sensor networks. Embodiments are described herein in a generalised manner, as well as with reference to specific examples.

Figure 1:
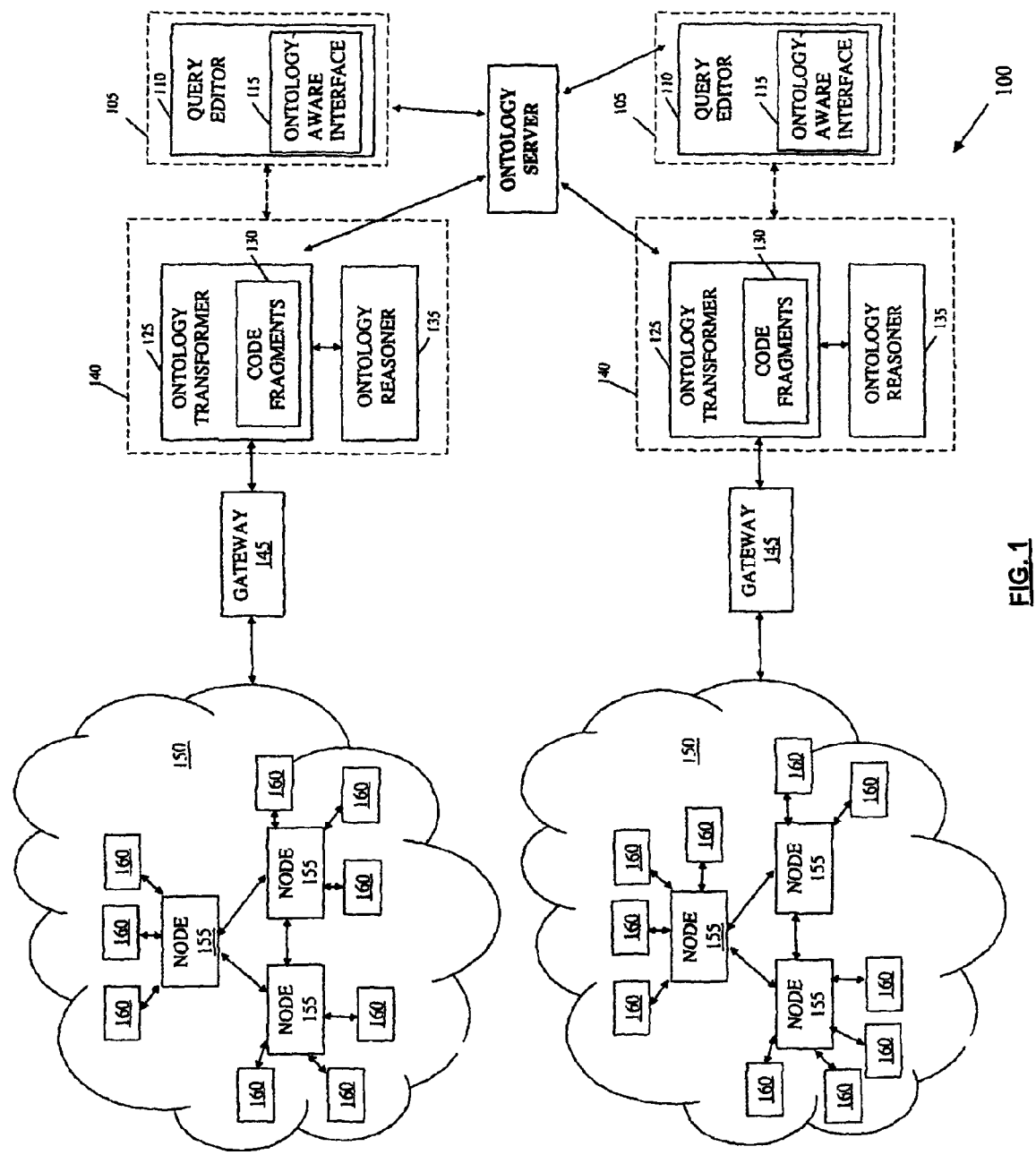
FIG. 1 is a block diagram of a system for ontology-driven querying and programming of sensors.

Referring now to FIG. 1, there is shown a system 100 for ontology-driven querying or programming of sensors. System 100 comprises one or more computer systems 105, such as a personal computer or server, each having a query editor 110 executable thereon. System 100 also comprises an ontology server 120, one or more ontology transformers 125, one or more ontology reasoners 135, one or more gateways 145, one or more nodes 155 and one or more sensors 160 associated with each node 155.

The query editor 110 comprises executable program code stored in a memory (not shown) of computer system 105 or otherwise accessible to computer system 105. Query editor 110 functions to facilitate user query or command formation and to interpret and display (in a display not shown) results received in relation to such queries or commands. The executable program code of query editor 110 comprises, or otherwise has access to, program code for executing an ontology-aware interface 115 for facilitating the creation or generation of queries or commands that are compliant with a predetermined ontology in relation to the one or more sensors 160. The query editor 110 is in communication with the ontology transformer 125 over a network, such as a public network like the Internet, via ontology server 120 so that the ontology transformer 125 receives the queries or commands generated by query editor 110 for processing as described herein.

Ontology transformer 125 and ontology reasoner 135 may be resident or executable on the same server system 140 or on separate servers. Server systems 140 are in communication with ontology server 120 over a network and with gateways 145 over a network.

When ontology transformer 125 receives a query or command from query editor 110, it passes the query or command to ontology reasoner 135, with which the ontology transformer 125 is in communication. Ontology transformer 125 may be comprised in a computer system, such as server system 140, and has a memory 120 (shown in FIG. 2) in which are stored code fragments 130. The code fragments 130 can be assembled to form suitable commands based on a classification of the query or command by ontology reasoner 135. The classified query or command generated by ontology reasoner 135 is processed by ontology transformer 125 to select one or more code fragments 130 that are suitable to execute the query or command. Ontology transformer 125 uses the selected code fragments 130 to generate and send a command to one or more nodes 155 via gateway 145 for execution in relation to one or more of the sensors 160. Such a command may be for retrieving data or information in relation to measurements made by the sensors 160 or for reprogramming or reconfiguring the sensors 160.

Ontology transformer 125 has access to a capability ontology that defines the particular functional capabilities of the sensors 160 in terms of the queries they can handle. The capability ontology should be designed so that the named capability classes that identify query types are disjoint. The ontology transformer 125 includes program code that searches the classification result for known, named, capability superclasses (immediate or transitive) of the query. When such a superclass is found (of which there is at most one), the ontology transformer 125 then invokes a particular module or method that is written to handle that query type. For example, when a query is classified to be of the type that reprograms the sensor node, the ontology transformer 125 executes program code that assembles and loads a new program for the sensor node 155, using instance information in the user's query to specify what the new program should do.

Transmission of commands from ontology transformer 125 to one or more nodes 155 may be performed over one or more networks, such as a public network like the Internet. Where numerous nodes 155 are to be accessed, an intermediate server or gateway node, such as gateway 145, may be employed to facilitate communication between such nodes 155 and ontology transformer 125.

As shown in FIG. 1, each node 155 has associated therewith, and is in communication with, one or more sensors 160. Such association of node 155 and sensors 160 may be physical and/or logical. The number of nodes 155 in system 100 may be as few as one and as many as the system architecture can support. The number of sensors 160 associated with each node 155 may similarly be as few as one and as many as the node and sensor network architecture can support. System 100 is specifically designed for scalability of the number of nodes 155 and sensors 160 because of the ontology-driven querying or command paradigm employed by system 100 that allows queries or commands to be processed independently of the underlying hardware or technical requirements of each of the sensors 160.

Ontology server 120 provides a repository for an ontology to be employed by all ontology transformers 125 within system 100. This ontology provides contextual information and a vocabulary for the phrasing of queries and commands over the sensor network, and may be considered to be comprised of two parts: a domain ontology that provides general background terms and a capability ontology that specifically models the functions of the sensors 160 and nodes 155 in the network. This capability ontology is also shared amongst the heterogeneous sensor networks 150 and is loaded into query editors 110.

For a domain ontology, some embodiments use an ontology expressed in the W3C's ontology language OWL, extended from SWEET (from NASA, at http://sweet.jpl.nasa.gov). SWEET provides contextual classes phenomena: Wind, space: Direction, property: Speed, property: Temperature including and property: RelativeHumidity. Some embodiments may extend SWEET to define classes and properties that are generally useful to describe the capabilities of sensors in a particular sensor network, for example including those shown in, FIGS. 4, 5, and 6. In the capability ontology, classes and properties may be defined that specifically model the capabilities of the sensors, for example such as those in FIGS. 8, 9, 10, 11, and 12.

Each ontology transformer 125 comprises computer program instructions (described in further detail below, with reference to FIG. 2) that allow the ontology transformer 125 to be configured to receive a query or command from query editor 110. Ontology transformer 125 employs ontology reasoner 135 to classify the query or command and map the classified query or command onto a capability ontology that accounts for the specific capabilities of the sensors in the destination sensor network 150.

Ontology transformer 125 builds a transformed query based on the classified query and capability ontology by sourcing code fragments 130. In this way, ontology transformer 125 may be considered to apply a dynamically determined ontology transformer to each received query or command thereby allowing the query or command to be executed in relation to the sensors, regardless of any heterogeneity among the sensors.

Code fragments 130 comprise data in the form of language templates or program fragments in the language of the destination sensor nodes 155. Such code fragments 130 are used by the ontology transformer 125 to generate executable programs or queries in the language of the sensor nodes 155, as described herein.

The transformed query or command is sent by ontology transformer 125 to gateway 145 (which may comprise a node 155 within sensor network 150) over a network or via a dedicated communication medium, whether wired or wireless. Ontology transformer 125 may also use a result filtering module 245 (FIG. 2) to filter responses returned from sensor network 150 via gateway 145, where the returned data from gateway 145 is more than what is required for a complete response to the original query. For example, using a weather station as an example of a sensor node 155 that provides a native command to request the current data from all sensors simultaneously, the ontology and query editor 110 may permit the user to query the current measurement from any particular sensor (see QueryCurrentData in FIG. 9: one or more sensors must be named in the query). The ontology transformer 125 issues the same command to the weather station (which acts as a sensor node 155) in each case, because each such query is a subclass of QueryCurrentData, but the ontology transformer filtering code within result filtering module 245 discards the part or parts of the response that do not correspond to the named sensor or sensors.

Ontology reasoner 135 comprises computer executable program code for performing logical reasoning using the established axioms of an ontology. In particular, ontology reasoner 135 performs the function of classifying the classes and properties of the ontology into subsumption hierarchy. Thus, ontology reasoner 135 is employed by ontology transformer 125 to classify a query or command according to the established ontology, which is referred to herein as the domain ontology. Where ontology reasoner 135 is unable to classify the query or command according to the domain ontology, a message to this effect is provided to ontology transformer 125, which in turn notifies query editor 110 so that a suitable message can be displayed to the originating user or other query originator, if necessary.

As a validation step prior to sending the query to ontology transformer 125, query editor 110 may initially provide the query or command to ontology reasoner 135 for classification. If the query or command can be classified as a subconcept of a capability concept for at least one sensor node 155, then this, in effect, validates the query or command for further processing within system 100. If classification cannot be performed, then query editor 110 can be used to reframe the query or command.

Gateway 145 comprises a node within the sensor network 150 that may or may not have its own sensors 160 associated therewith and may comprise a fully functional sensor node 155. Gateway 145 is used as the network access point for sensor network 150, for example through a public or private network, such as the Internet or a public switched telephone network (PSTN). Gateway 145 should have a reliable power supply in order that it can reliably perform its gateway function. Gateway 145 is used as a point of control and single access to and from sensor network 150.

Each sensor node 155 generally comprises a programmable system for activating and controlling the individual sensors 160. Each sensor node 155 may store measurements and communicate with other nodes 155 by radio or fixed network to share sensor measurements or other messages, including messages received via gateway 145. Non-limiting examples of sensors 160 may comprise chemical, biological, electrical, physical or other sensors for measuring environmental, medical, industrial or other conditions, for example.

Sensor network 150 comprises a collection or grouping, whether virtual or physically associated, of sensor nodes 155 and sensors 160, where nodes 155 and sensors 160 within network 150 have at least one common theme, function, role or association that makes them desirably grouped together within a network.

The capability ontology is designed such that the classification of a query by the ontology reasoner 135 places that query into a class of like queries (a capability class) for which common program code in the ontology transformer 125 may be used to execute the query. The ontology transformer 125 includes program code (such as may be comprised in query management module 240 described below in relation to FIG. 2) that searches the classification result for known, named, capability classes that are superclasses (immediate or transitively) of the query. When such a superclass is found, the program code then invokes a particular module or method that is written to handle that capability class. Some capability classes require parameters, such as a particular date or temperature range, so the individual part of the query (comprising datatype and object property instances) can be passed as a parameter to query management module 240 and can be used to particularise the query according to the user request.

For example, sensor network 150 may use the Environdata WeatherMaster 1600 weather station, which has an inbuilt processor and memory with a predefined control language, with the weather station acting as a sensor node 155 with several sensors 160. One of the recognised commands, the STORAGE command, can be used to reprogram the weather station to take selected sensor readings at selected intervals and to store the raw readings or aggregate readings in a selected memory location. The STORAGE command itself begins with the keyword "STORAGE" which is followed, on the same line of text, by parameters to reflect those selections. For effective use of the command, it must be preceded by the one-line command "MEM ON" and followed by the one-line command "MEM OFF". All three commands must be transmitted to the weather station to reprogram the weather station.

Query editor 110 supports a user to construct a query as an expression in the ontology language. For example, let us consider the reprogramming query of FIG. 10. By the definition of the class given in FIG. 10, the query is a subclass of a CreatedFunctions class. The user creates this query class and requests the reasoner ontology 135 to classify it. If it is not a subclass of a capability class, then it is not a valid query and can be rejected. In this case, it is a subclass of the setStorageFunction class of FIG. 9. The user is then prompted to enter datatype values for (inherited) instance properties of the class. Because the capability ontology is designed with appropriate datatype properties for classes used in the query, the query editor 110 immediately prompts for the property values: in this case integers for hasStrgTabNo, time1 and time2ofDay, as properties of CreatedFunctions. Suppose the user enters the values of 3, 0900 and 0, respectively. Further, suppose the ontology has been previously initialised with a sensorNo datatype property of HumiditySensor set to a value of 5, which corresponds to the weather station's native sensor numbering system, the Day class to have a property timetypeCmd with value "HOUR" (which, in the native language means to measure daily at a fixed time of day) and the Average class to have a datatype property statCmd set to a value of "AVERAGE". When the ontology transformer 125 receives the query and instances from the query editor 110, it classifies the query as a subclass of the setStorageFunction capability class and uses internal code to translate the query to the form required by the weather station as follows. The ontology transformer 125 constructs the "STORAGE" command string, appending the parameters appropriately as retrieved from the query instances. It also internally generates a commandNo through an internal sequence number allocation method and inserts fixed character strings where required. In this case, in the language of the WeatherMaster, the requested command becomes "STORAGE 6 AVERAGE 3 5 1 0 0 HOUR 0900 0", where the parameters correspond respectively to commandNo, statCmd, hasStrgTabNo, sensorNo, 1, 0, 0, timetypeCmd, time1, and time2ofDay. Further, the ontology transformer 125 brackets this line of text by the two MEM commands discussed above.

Figure 2:
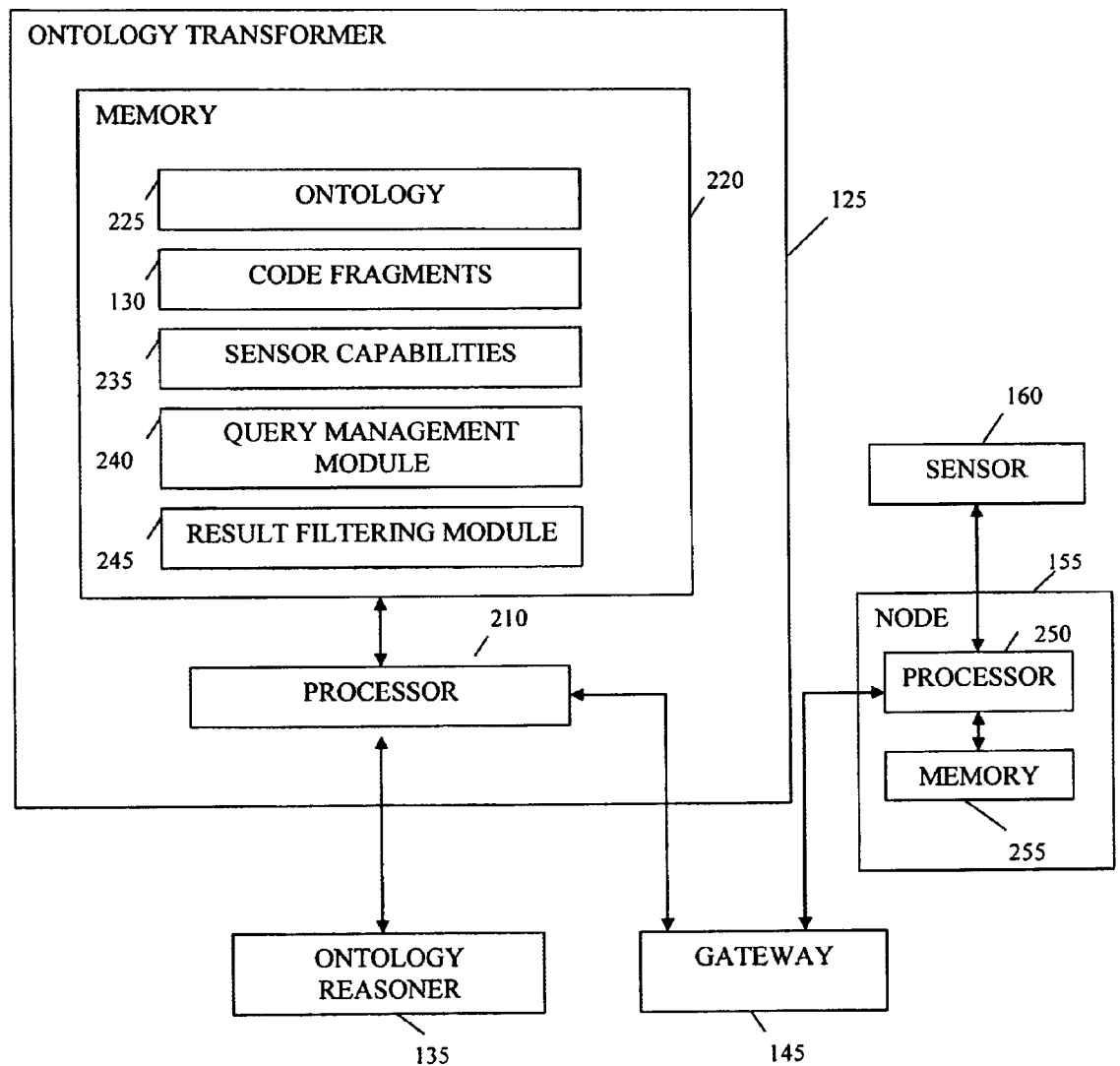
FIG. 2 is a block diagram showing some components of the system of FIG. 1 in further detail.

Referring now to FIG. 2, ontology transformer 125 is shown in greater detail with reference to at least one node 155 and at least one sensor 160. Ontology transformer 125 comprises a processor 210 and a memory 220. Various software components 225, 230, 240 and 245, in the form of executable program instructions, are stored in memory 220 and are executable by processor 210. Processor 210 may comprise one or more processors, either physical or virtual and either co-located or distributed. Memory 220 is accessible to processor 210 and may comprise one or more storage media, whether distributed or localised.

When executing, the ontology transformer 125 loads a domain ontology 225 into memory 220 from ontology server 120. Ontology transformer 125 also loads a predetermined local ontology of sensor capabilities 235 from ontology server 120 or retained in the ontology transformer 125, and combines the capability ontology with the domain ontology 225 to form an ontology that the ontology transformer 125 uses to map classified queries or commands onto suitable code fragments 130 that can be executed at nodes 155. The capability and domain ontologies may be combined by file concatenation, after removing any duplication of header text or other redundant text in the second file. Alternatively one ontology may be imported into the other using features of the ontology language, or, similarly, a third skeleton ontology may import each of them.

Memory 220 also comprises a query management module 240 that, when executed by processor 210, is configured to receive a query from query editor 110, combine that with the domain ontology and sensor capability ontology, and then invoke ontology reasoner 135 to classify the query into a query class already described in the capability ontology. If the query class is not subsumed by a query class in the capability ontology, then the query is rejected as invalid because the query does not request a function that the sensor network is able to perform. In order to combine the query with an ontology, the query may be asserted as a named class description in the ontology by, for example, appending it to the ontology file prior to submitting the ontology to the ontology reasoner 155 for classification.

Ontology transformer 125 uses the query class to access a library or file system of code fragments 130 or code templates that embody the structures to execute the query class in the language of the sensor network. Ontology transformer 125 then completes the transformation by completing the templates or program fragments according to parameters specified in the query, and submits the transformed query or command (as a program) to the gateway 145 for execution on the sensor network 150. The template is filled in by inserting data retrieved from the instance of the query class and its properties specified by the query editor or as asserted as instances in the ontology beforehand.

Queries submitted through query editor 110 may be composed of two parts. The first part is a class definition (and optionally associated property axioms) that is classified to determine the query type. The second part may be a group of instances that are used to further refine the query with grounded values for datatype properties or other object properties of the class. Query editor 110 supports the entering of both types of information, but not all query types require instance data. As an example, the setStorageFunction query type of FIG. 9 inherits a datatype property called "time 1" from the Function class (via the CreatedFunctions class), and the query editor prompts the user to enter an integer into this field. Only the class definition part of the query is used for classification. The ontology transformer 125 may use this integer value as part of the command to the weather station— in particular it is a multiple for a time unit to separate sensing measurements. Similarly, ontology instances may be used to store some fixed values used in query processing (for example, the respective digit which corresponds to the weather station's identifier for each sensor in commands). These instance values become parameters to be inserted into the strings or program code being assembled for a sensor node command under construction.

Ontology transformer 125 receives responses back from the sensor network nodes 155 via the gateway 145. In the case that the response received contains more data than is required, to satisfy the original query which can happen if the sensor network is not capable of being as selective as required, ontology transformer 125 will apply a result filter using a result filtering module 245 to reduce the results to only those specified in the original query. The ontology transformer 125 then returns the filtered or unfiltered results to the query editor 110.

The Gateway 145 transmits and installs the classified and transformed program or query received from the ontology transformer 125 onto one or more nodes 155 and loads the program or query into a memory 255 of the relevant sensor network nodes 155 of the sensor network for which the gateway 145 is responsible. The classified and transformed query or program is then executed by a processor 250 of each node 155 to which the query or program was directed. According to the program or query, some sensors 160 of the network may become active and take measurements, which are recorded in the memory 255 of the node 155 and possibly further analysed by the processor 250 according to the query or program instructions. The measurements are then transmitted to the gateway 145 in one or more messages. The gateway 145 may aggregate responses from more than one sensor node 155 within sensor network 150 and will then transmit one or more responses to the ontology transformer 125.

Figure 3:
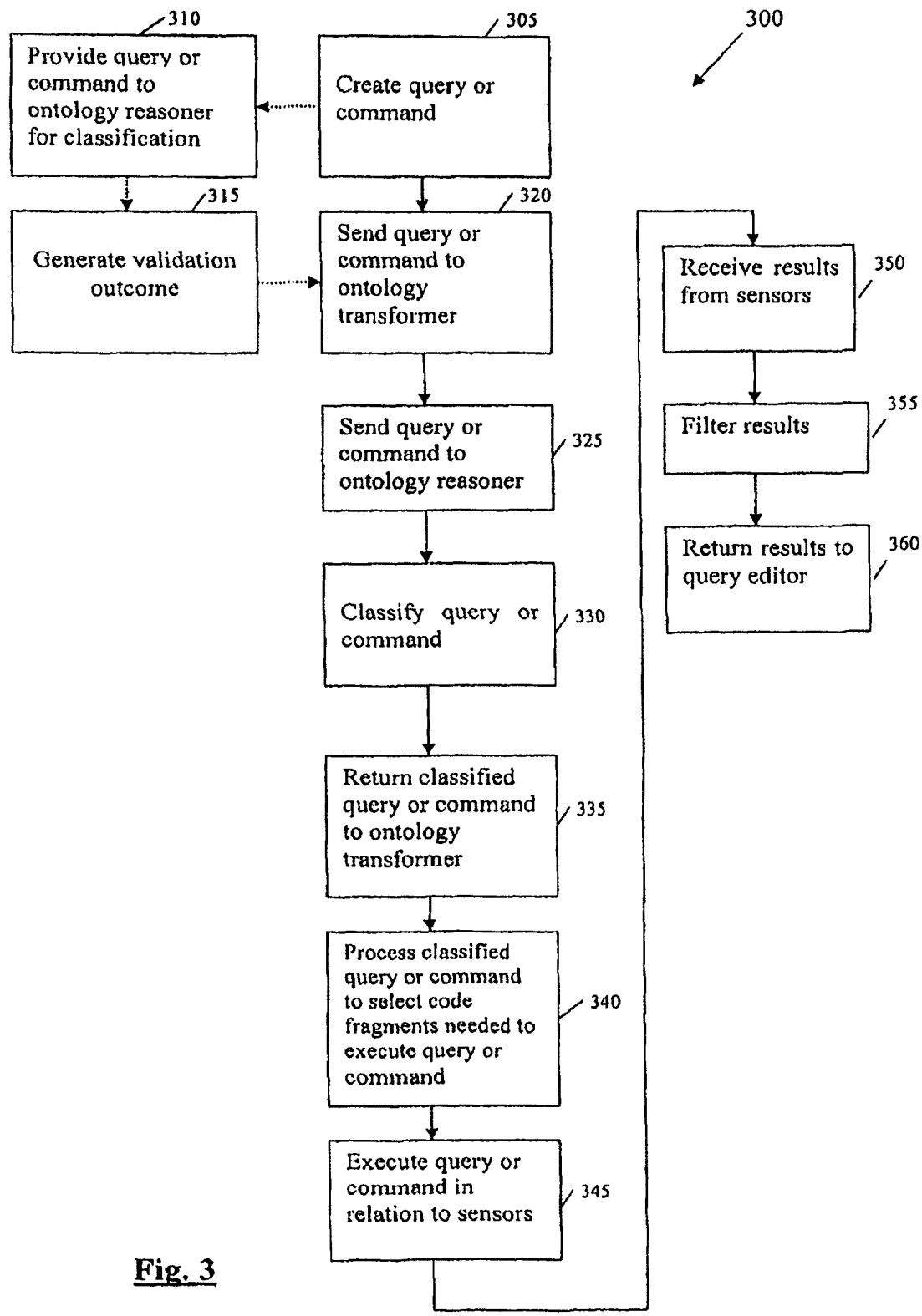
FIG. 3 is a flow chart of a method for ontology-driven querying and programming of sensors.

Referring now to FIG. 3, there is shown a method 300 of ontology-driven querying and programming of sensors. Method 300 begins at step 305, in which the ontology-aware interface 115 accepts a query or command. The query or command may be represented as a fragment of web ontology language (OWL) code, for example, containing one or more class descriptions and property axioms and may also include instances of classes, object properties and datatype properties. The query or command may be received from a query origin that relies on user input or from an automated querying system. Alternatively, the query or command may be represented as description logic axioms or by graphical means in a graphical ontology editor, such as Protégé or a Protégé plug-in.

As an optional validation sub-process, the query or command, together with an ontology (comprising a domain ontology and one or more capability ontologies) may be sent by query editor 110 to an ontology reasoner 135 at step 310 for classification of step 315 and the classified ontology returned to the ontology-aware interface 115 for presentation to the user and for error reporting. In order for the query to be valid it must be classified as a sub-class of a query class in the ontology capability class, and the sensor nodes in the ontology that are capable of responding to that query class are the nodes to which the transformed query may be sent.

At step 320, the query or command is sent to the ontology transformer 125. The ontology transformer 125 repeats steps 310 and 315 (in steps 325 and 330) by sending the query or command to ontology reasoner 135 to classify the query or command, to validate it, and to discover which sensor nodes are capable of responding to the query or command. At step 335, ontology reasoner 135 returns the classified query or command to ontology transformer 135. This is generally a representation of the combined ontology and query or command that places the query or command within a subsumption hierarchy and from which the query or command's subclasses and superclasses in the ontology may be readily extracted.

At step 340, the ontology transformer 125 retrieves code fragments 130 or command templates that correspond to the query class in which the query was classified, and then assembles the fragments and fills in remaining parameters arising from the query or command, so producing an executable query or program for the sensor network 150. At step 345 the executable query or program is transmitted to the sensor network 150 by the appropriate communication medium and the relevant nodes 155 sensor network 150 are instructed to execute it.

At step 350, which may be repeated many times if results are requested at timed intervals or according to other recurring criteria, the results from the nodes 155 in sensor network 150 are returned to the ontology transformer 125 via gateway 145.

At step 355, if the results contain more data than required for the original query, the excess data is filtered out and the remaining results are returned to the query editor or possibly some other destination (as specified in the original query or command) at step 360. For example, if the user query requests temperature data in a query of the queryCurrentData type (FIG. 9), the weather station can only return data for all sensors at once, so then the query to the weather station just asks for all sensors and the ontology transformer 125 parses the result and discards the unwanted data. In more detail, the sensor number is stored as an instance for each sensor in the ontology, and passed with the concept part of the query to the ontology transformer 125. The ontology transformer 125 constructs the query without the sensor number, but then just passes back lines of the response that have the right sensor number in the appropriate position on the line.

Specific examples of components of system 100 and/or steps of method 300 are described hereinafter. All such examples are merely illustrative and are non-limiting, being intended for contextualising the described embodiments.

According to the described embodiments, a user, which may be a human or software agent and may be unfamiliar with sensor availability or programming style, can use the language of an ontology to phrase a query that is a request for some sensor observations to be made or a command for some specific reconfiguration of those sensors. This query or command is sent, in a modified form, to one or more sensor nodes 155, which act as sensor control devices. A sensor node 155 control may comprise, for example, a programmable weather station, where the sensors 160 are sensors that accomplish a weather-related measurement function, such as temperature, relative humidity, wind speed or wind direction measurement, for example. In this example, the weather station (as one example of a sensor node 155) receives the transformed query or command and executes that query or command in relation to the environmental sensors with which it is associated and in communication (whether or not physically connected thereto).

For illustration purposes, the weather station example is continued. In this example, the weather station may be a Weather Master 1600, available from Environdata Australia Pty Ltd of Queensland, Australia, as one sensor node 155. Query editor 110, ontology transformer 125 and ontology reasoner 135 may use a web ontology language such as OWL, and in particular the sub language OWL-DL, as the ontology language. Pellet version 1.5.1 by Clark & Parsia LLC may be used as the ontology reasoner 135 for OWL-DL. Protégé OWL editor 3.3.1 from Stanford University may be used as the query editor 110, optionally in combination with a Java (Version 6) plug-in to Protégé. The Java plug-in implements the ontology-aware interface 115 to provide a graphical user interface (GUI) and for interfacing with a Java implementation of ontology transformer 125.

The general ontology described herein may be a purpose-built ontology, as described herein, that imports the ontology SWEET 1.0 published by NASA. This ontology may be thought of as a combination of a domain ontology and a sensor capability ontology, as described herein. In the present context, the domain ontology may be considered to be that part of the ontology that may persist unchanged as a base ontology, while the capability ontology is changed and extended to account for each new sensor network 150 added to the system 100.

The examples described below show extracts the domain ontology displayed in Protégé, but it should be understood that other manifestations of the OWL ontology language may be used, including but not limited to logical expressions, the Manchester Syntax, the OWL 2 Functional-Style-Syntax or RDF/XML, which is an XML (extensible mark-up language) syntax for RDF (Resource Description Framework).

The weather station sensor capabilities may be modelled in the ontology as described below. The weather station has four sensors: a temperature sensor, a relative humidity sensor, a wind speed sensor and a wind direction sensor. Each sensor of the weather station is modelled as a class with the SWEET superclass "material_thing: Sensor restricted to using the measures" property with a sensor-specific filler, as illustrated in FIG. 4.

The weather station, and many other sensing devices, can take a measurement and compute the average, maximum and minimum of the current value and past (stored) values. This capability is modelled as subclasses of a created class "Statistic" with no special restrictions but disjoint to each other, as shown in FIG. 5. Measurements can be taken periodically, once every x units, for some integer x and where a unit is either day, hour, minute or second. A class is defined for each of these units as follows and illustrated in FIGS. 6 and 7. Each of these units is defined to be a subclass of the corresponding class of the SWEET ontology. For example, the capability class "Second' is a subclass of "time: Second' of the domain ontology, which has the superclass "time: Duration". Further, the property "hasSubPeriod" is used to model how each unit relates to other time units. For example, the class "Hour" has restrictions corresponding to having each of "Minute" and "Second' as sub-periods but (with an additional closure axiom) no other sub-periods. The smallest unit, the "Second', is defined to not have any sub-periods, as shown in FIG. 7. In FIG. 7, definitions above the horizontal line are complete (necessary and sufficient); the extra information below the line represents conditions inherited from SWEET and displayed by the Protege tool, but not important for this discussion.

To request data from the weather station, it is desirable to be able to use specific dates as time specifications, thus we model the class "Date" as a subclass of SWEET's "time: Instant".

The basic elements of the sensor device capability have been described, and now modeling of the structure of the language for interacting with the weather station is described. The functions of the weather station language are organised so that any user query can be mapped to the weather station language by a simple classification made by the ontology reasoner 135. For example, the weather station supports three kinds of queries as native capabilities:

Query the current data of all sensors[queryCurrentData]
Query a memory for data from date A until date B [queryPeriodData]
Reprogram by adding or deleting program lines in the weather station, which describe exactly what, when and how we want to measure [setStorageFunction]

A corresponding ontology structure is created as illustrated in FIG. 8. The class "Function" is created, which is a direct subclass of "owl: Thing". Below that, two classes are introduced, which act like a container for other classes and help to keep the hierarchy well ordered. All queries are placed under the "CreatedFunctions" class (see following section), and there is a "Capabilities" class, such as "WM1600Capabilities" to describe the capability classes, which are a focus of the ontology. There is no need for different sensor devices to have different "Capabilities" subclasses—alternatively the capabilities may be grouped into classes by another convenient class. However, each capability class must be defined to be disjoint from other capability classes.

Each of the capability classes are defined in more detail by restrictions which correspond to the parameters required by the weather station to enact a selected function, as shown in FIG. 9. Complete (necessary and sufficient) definitions are used for these capability classes and their definitions ensure that they are disjoint. The disjointness of the definitions can be confirmed by the ontology reasoner 135, if desired when developing the appropriate capability description.

The classes defined so far provide a framework for expressing user queries. A valid query for any device is exactly a class definition that is a (semantic) subclass of a predefined device capability. By 'semantic subclass' is meant that the query may be interpreted to be a subclass by a sound OWL reasoner; it is not required that the query be explicitly asserted as a subclass. For example, to reprogram the weather station, it is necessary to use the three properties "usesPeriod", "usesSensor" and "usesStatistic". To ask the weather station about the current temperature, it is necessary to use the "usesSensor" property, and also express that the other properties are not used, by negating these restrictions.

FIG. 10 shows the definitions of two example queries, one to reprogram the weather station, and one to request the current humidity. As is evident, these queries are similar to the parent capability classes. In the context of a more complex ontology, the queries could appear to be syntactically quite different to the capability classes, because the ontology reasoner 135 is capable of interpreting the ontology correctly to identify the proper semantic relationships. To keep the ontology well-ordered (with no significant semantic effect), both queries are defined as subclasses of the "CreatedFunctions" class.

The example query to request the current humidity is quite simple, as it is just specified to use only the "HumiditySensor", while the other properties of the corresponding capability definition are negated.

The example query to reprogram the weather station takes advantage of the ontology to enable the system to recognize when a query can be answered by another query that has also been requested. For this query (FIG. 10), a period restriction (usesPeriod some (time: duration and (hasSubPeriod some Day))) is given that is necessary and sufficient, in addition to an only necessary restriction (usesPeriod some Day). This means that a reprogramming query that describes a request for a measurement which can be answered by filtering (selecting) the measured data from another reprogramming query will be classified by the ontology reasoner 135 as a subclass of the latter. For example, a reprogramming query which measures the data from the humidity sensor every minute would be classified as a subclass of the reprogramming query measuring data from the humidity sensor each five seconds. Relying on this, after classification, the ontology transformer 135 can simply transmit the highest-classified reprogramming queries to the weather station, as others which are subsumed by at least one highest-classified query are redundant.

When the ontology reasoner 135 is invoked, either by ontology transformer 125 or query editor 110, each query that is valid, in the sense that it corresponds to a defined capability of a sensing device, will be immediately classified as a subclass of the respective capability. The reasoner's classification may be inspected visually using the query editor 110 or programmatically with other software such as the ontology transformer 125. Furthermore, the ontology reasoner 135 may be invoked to ensure that the query class is itself satisfiable in the context of the ontology, which will enable the early rejection of some queries that can never have an answer (for example, a query with a restriction that usesPeriod some Day and another restriction that not usesPeriod owl: Thing)). Because of the original design of these capability classes, this means that the corresponding structure of the device command language is immediately identified.

Further examples of queries are shown in FIG. 11. These example queries will both be classified as subclasses of the capability class "queryPeriodData", although appearing syntactically quite different.

So far, queries have been described as classes that act as a template, or schema, that is itself a subclass of a more general device capability. The ontology is also used to represent OWL datatype properties of queries, so that it is possible to distinguish queries by the values of query parameters. At this level, queries are represented as instances of a particular query class and its properties, having the query parameters instantiated as the values of OWL datatype properties. Similarly, the current state of the weather station is modelled as a collection of instances of the ontology.

The capability ontology captures the definition of multiple sensor devices by defining a class for each device as a subclass of a "Device" class, and the "hasFunction" property as a property having domain Device and range Function, as shown in FIG. 12.

As illustrated in FIG. 10, queries that reprogram the device or request measured data may be phrased by a user in the terms of the capability ontology. This can be implemented by creating a definition of a class corresponding to the query, by verifying the validity of the request (using ontology reasoner 135), by passing the request onto relevant device-specific handlers (sensor nodes 155), and then onto the native device interface (sensors 160), and then receiving the response and passing it to a viewing application, such as query editor 110 or another destination.

For example, the Pellet OWL-DL reasoner can be used, which runs on a remote host 140 and can be used by the ontology transformer 125, as well as by the user's Protégé client. The user can query and program the weather station through the Protégé OWL Editor 3.3.1 as the user interface, or more conveniently through a Protégé plug-in graphical user interface (GUI) that is able to simplify the ontology display and interact with the ontology transformer 125. It is assumed that the Protégé and plug-in client are installed locally on computer system 105 for the user, and that the ontology transformer 125 is deployed on another computer systems 140, which is in communication with the weather station according to its own device-specific interface requirements. The communication between the query editor 110 and the ontology transformer 125, and between each of those and the ontology reasoner 135, may be via a TCP/IP socket, for example.

As an alternative to direct use of Protégé as a user client tool, the definition of the capability classes in the ontology enables the run-time generation of a user interface which can provide, in this case, three options of selecting classes from a pre-filtered class tree, where only allowed capability classes are listed. Through this interface, a user can select permitted classes to phrase the query without direct Protégé interaction. This client tool can be implemented as a Protégé plug-in. After a selection, the client tool may automatically negate the restrictions which the user left unselected on the interface to form a query.

Embodiments have been described as they apply in particular to the programming of a weather station in its proprietary control language. The capability ontology is structured into storage functions, sensors, periods, etc according to the documented characteristics of that language. However, other suitable programming languages will have function groupings which may be similar to this in principle (and for which a functional classification within the ontology can be developed) but will differ by the terms used and by their classification structure.

A deployment method is described herein according to an implementation that is specific to the control interface available for the weather station. Those skilled in the art can adapt this method for an alternative deployment technique, such as via "Deluge" that can be used for over-the air programming of wireless sensor networks.

Embodiments have been described in terms of programming and querying features of the environment that may be measured by a weather station, but the embodiments are not restricted to this. Embodiments can apply to any measurements taken by in-situ sensors with a remote control possibility, such as still or video images; sound; human health indicators such as blood pressure, heartbeat, or blood sugar; water flow, pressure and quality parameters such as dissolved nutrients and turbidity; ecological parameters such as sunshine, wildlife location, density and motion; security monitoring parameters such as infrared beams and motion detectors; geophysical parameters such as seismic perturbations and wave motions, built environment or transport parameters such as energy consumption, heating, ventilation or traffic flow; or any other remote sensing measurement or application.

Embodiments are described in terms of a specific design and implementation that has been put into practice, but the embodiments permit many possible architectures and tool components. A plug-in to the third-party Protégé ontology editing software is described, but other suitable editors or methods for developing ontologies can be used, and other mechanisms may be employed to allow a user to express a sensor data requirement in the terms of an ontology, such as a specialist GUI or a textual format such as an OWL document. Such alternatives must accept that query, combine it with the domain ontology, invoke a reasoner for classification, retrieve code fragments according to the classification result, and assemble those code fragments in a suitable way.

A variation that would provide another way to assemble the code fragments would be via retrieval of compile-time flags through the classification, and then providing the flags to a compiler to conditionally compile a code library or to set compile-time parameters in the usual way. This might be done when, for example, the target language for the sensor network is NesC. Another variation would be to apply the technique to generate commands in the SQL-like language of TinyDB, a database system for TinyOS-based sensor networks, in place of the weather station native command language as detailed here.

Embodiments have been described in terms of the software components interacting via TCP/IP sockets, but other distributed computing or basic communication protocols could be used.

In the described embodiments the ontology comprises data that may be updated and extended as required to represent the addition of new sensor capabilities into the sensor network querying environment. These new sensor capabilities may represent both new domain-level capabilities (new phenomona may be measured) or new control and interface capabilities. However, because this information is represented in the ontology, and the ontology is read dynamically into the query interface and actioned dynamically through the reasoning tools, providing the new capability to users requires no change to user query tools and shields the user from needing to learn anything about the programming interface for the sensor nodes 155 or gateway 145.

Improved features relate to the use of the domain and capability ontologies, supported by an ontology reasoner 135 that can make sound inferences over the ontology language, to classify user-specified queries into classes that identify the sensor-specific code that can be assembled and executed to realise the query. This is supported by the (domain and capability) ontology awareness of the query editor 110 and provides a navigable, hierarchical structure to describe sensors available for querying and also shields the user from awareness of the heterogeneity of sensor programming languages, while permitting sound and expressive user queries to be written.

Advantageous features of the described architecture and methodology reside in the use of the described formal reasoning (or logical inference) over the ontology as a component of the query/command processing. This formal reasoning is generally described as "classification" but may be more broadly described as "logical inference". Such features allow the system 100 to perform query validation and allocation of queries to sensor nodes 155 that can handle such queries without requiring special code (i.e. purely on the basis of the structure of the ontology that is a data input to system 100). This is described and illustrated further in the Example provided below.

The described system architecture and methodology allows the reprogramming instructions to be checked for redundancy based on the ontology alone and therefore reduces the need for frequent reprogramming, which is important in an environment of a shared/multi-user sensor network resource. The described system architecture and methodology also allows for the organisation of node-specific program code used for translation into the query or command language of the sensor node 155 according to the structure of the node command language, rather than according to the structure of the network-wide query language that is embedded in the ontology. This isolates the syntaxes of the two languages and permits varying and, if desirable, multiple syntaxes in the ontology language for the same node-specific query or command without the cost of additional program code. For example, the classification process performed by the ontology reasoner 135 can place a query into a relevant class, and then the ontology transformer 125 will have the program code to handle that class. This allows the ontology transformer 125 to not be overly prescriptive about acceptable syntaxes for queries, and instead address the query semantics. The described system architecture and methodology also allows heterogeneity in sensor nodes and gateways to be hidden from the user, thereby making use of the sensor network easier for the user.

The following Example shows how the system 100 can classify a query so that it is immediately obvious which devices (e.g. sensor nodes 155) can handle the query. This enables query editor 110 to direct the query to the ontology transformer that is responsible for managing the relevant devices.

This Example uses the definition of the WM1600 class as given in FIG. 12 and its capabilities as given in FIG. 9. Now a class can be constructed that corresponds to a query, say the "Request current humidity query" of FIG. 10. This class can be called, for example "myCurData1".

Figure 13:
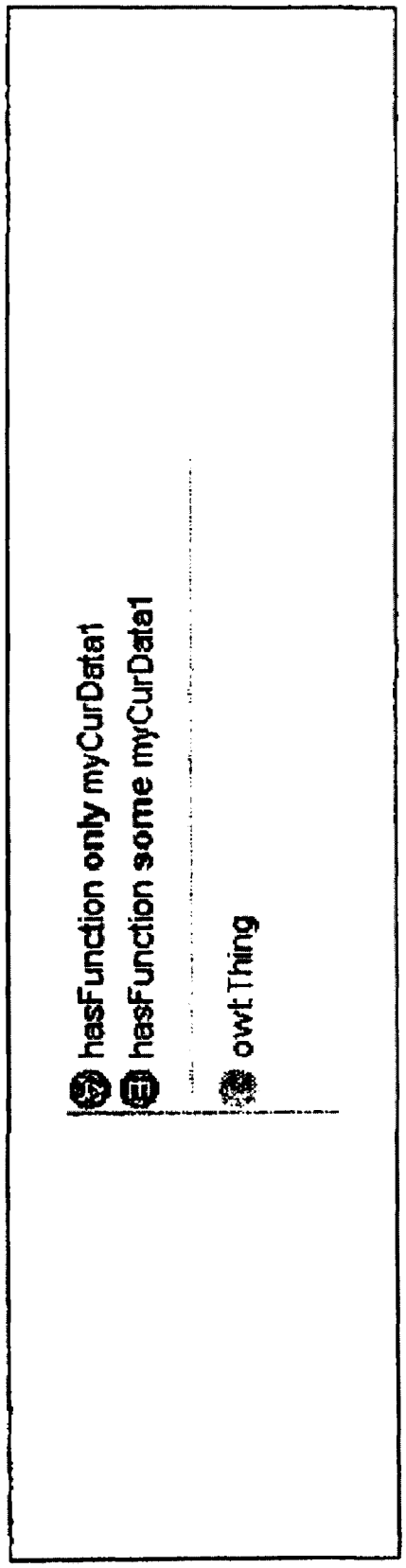
FIG. 13 is an illustration depicting a class to find which devices can handle myCurData1 query.

Now a new class can be defined that describes all the devices (e.g. sensor nodes 155) that can accept the query "myCurData1" as shown in FIG. 13.

When this new class (FIG. 13) is classified by the ontology reasoner 135, every device which is capable of handling the query "myCurData1", such as class "WM1600", will become a superclass of this class. By maintaining a mapping for sensor nodes 155 to the ontology transformers 125 responsible for them, the query editor 110 can direct the query to the indicated ontology transformer 125.

When this new class (Table 10) is classified by the ontology reasoner 135, every device which is capable of handling the query "myCurData1", such as class "WM1600", will become a superclass of this class. By maintaining a mapping for sensor nodes 155 to the ontology transformers 125 responsible for them, the query editor 110 can direct the query to the indicated ontology transformer 125.

In this description the examples of ontology expressions are given as screen copies of the expression in the ontology editor Protégé 3.3. In that style, expressions above a horizontal line are "necessary and sufficient" (also called "complete" or "equivalent classes") and those below the horizontal line are "necessary" (also called "superclasses"). Expressions separated by large dots are combined conjunctively. Where the horizontal line is not displayed, the expressions are necessary and sufficient.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of ontology-driven querying or programming of at least one sensor, the method comprising:
  generating at a query origin a query or command for execution in relation to the at least one sensor;
  transmitting the query or command to an ontology transformer over a first network;
  after the transmitting, classifying the query or command according to an ontology and one or more predetermined capabilities of the at least one sensor;
  generating a transformed query or program based on the classified query or command using one or more code fragments stored in a memory accessible to the ontology transformer;
  transmitting the transformed query or program to at least one sensor node in communication with the at least one sensor for execution of the transformed query or program by the at least one sensor node in relation to the at least one sensor;
  receiving from the at least one sensor node at least one result of the executed transformed query or program; and
  returning the at least one result.

2. The method of claim 1, wherein the at least one sensor is comprised in a sensor network.

3. The method of claim 2, wherein the at least one sensor node is comprised in the sensor network and the sensor network has a plurality of sensor nodes.

4. The method of claim 1, wherein the at least one result is returned to the query origin.

5. The method of claim 1, wherein the at least one result is returned to a destination other than the query origin.

6. The method of claim 1, further comprising filtering the at least one result prior to returning the at least one result.

7. The method of claim 6, wherein the filtering comprises reducing the at least one result from a larger result set generated by execution of the transformed query or program to a result set that satisfies the query or command generated at the query origin.

8. The method of claim 6, wherein the filtering is performed by the ontology transformer.

9. The method of claim 1, wherein the transmitting of the transformed query or program and receiving of the at least one result is performed via a gateway node in communication with the ontology transformer over a second network.

10. The method of claim 1, wherein the receiving of the at least one result is performed at the ontology transformer.

11. The method of claim 1, further comprising validating the query or command prior to transmitting it to the ontology transformer.

12. The method of claim 11, wherein the validating comprises transmitting the query or command to an ontology reasoner for classification by the ontology reasoner according to the ontology and the one or more predetermined capabilities.

13. The method of claim 1, wherein the transmitting of the query or command to the ontology transformer comprises transmitting the query or command over the first network to an ontology server that has access to the ontology, wherein the ontology server transmits the query or command to a specified one of one or more ontology transformers accessible over the first network.

14. The method of claim 1, wherein the query origin comprises a query editor having an interface configured to frame the query or command within the ontology.

15. A system for ontology-driven querying or programming of at least one sensor, the system comprising:
    means for generating at a query origin a query or command for execution in relation to the at least one sensor and for transmitting the query or command to an ontology transformer over a first network;
    means for classifying the query or command according to an ontology and one or more predetermined capabilities of the at least one sensor;
    means for generating a transformed query or program based on the classified query or command using one or more code fragments stored in a memory accessible to the ontology transformer,
    wherein the means for generating a transformed query or program comprises
        means for transmitting the transformed query or program to at least one sensor node in communication with the at least one sensor for execution of the transformed query or program by the at least one sensor node in relation to the at least one sensor and comprises
        means for receiving from the at least one sensor node at least one result of the query or program and returning the at least one result.

16. The system of claim 15, wherein the means for generating the transformed query or program comprises the ontology transformer.

17. A system for ontology-driven querying or programming of at least one sensor, the system comprising:
    a query origin configured to generate a query or command for execution in relation to the at least one sensor;
    an ontology reasoner configured to classify the query or command according to an ontology and one or more predetermined capabilities of the at least one sensor;
    at least one sensor node in communication with the at least one sensor; and
    an ontology transformer in communication with the query origin, the ontology reasoner and the at least one sensor, wherein the ontology transformer is configured:
        to receive the query or command and pass the query or command to the ontology reasoner for classification,
        to generate a transformed query or program based on the classified query or command using one or more code fragments stored in a memory accessible to the ontology transformer,
        to transmit the transformed query or program to the at least one sensor node for execution of the transformed query or program by the at least one sensor node in relation to the at least one sensor,
        to receive from the at least one sensor node at least one result of the query or program and
        to return the at least one result.

18. The system of claim 17, wherein the at least one sensor is comprised in a sensor network.

19. The system of claim 18, wherein the at least one sensor node is comprised in the sensor network and the sensor network has a plurality of sensor nodes.

20. The system claim 17, wherein the ontology transformer is configured to filter the at least one result prior to returning the at least one result.

21. The system of claim 20, wherein the ontology transformer is configured to reduce the at least one result from a larger result set generated by execution of the transformed query or program to a result set that satisfies the query or command generated at the query origin.

22. The system of claim 17, further comprising a gateway node in communication with the ontology transformer over a second network, wherein the transmitting of the transformed query or program and receiving of the at least one result is performed via the gateway node.

23. The system of claim 17, wherein the ontology reasoner is configured to validate validating the query or command prior to transmitting it to the ontology transformer.

24. The system of claim 17, wherein the at least one result is returned to the query origin.

25. The system of claim 17, wherein the at least one result is returned to a destination other than the query origin.

26. The system of claim 17, further comprising an ontology server that has access to the ontology, wherein the transmitting of the query or command to the ontology transformer comprises transmitting the query or command over the first network to the ontology server, wherein the ontology server is configured to transmit the query or command to a specified one of one or more ontology transformers accessible over the first network.

27. The system of claim 17, wherein the query origin comprises a query editor having an interface configured to frame the query or command within the ontology.

* * * * *